United States Patent
Eun et al.

(10) Patent No.: US 8,564,409 B2
(45) Date of Patent: Oct. 22, 2013

(54) METHOD AND APPARATUS FOR OPERATING SERVER FOR RFID READER AND METHOD FOR OPERATING RFID READER

(75) Inventors: Jee Sook Eun, Daejeon (KR); Jae Gak Hwang, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 249 days.

(21) Appl. No.: 12/948,343

(22) Filed: Nov. 17, 2010

(65) Prior Publication Data

US 2011/0148587 A1 Jun. 23, 2011

(30) Foreign Application Priority Data

Dec. 18, 2009 (KR) .................... 10-2009-0127510
Jun. 18, 2010 (KR) .................... 10-2010-0058044

(51) Int. Cl.
*H04Q 5/22* (2006.01)
(52) U.S. Cl.
USPC ........ 340/10.1; 340/10.4; 340/10.5; 235/375; 235/376; 235/385; 707/802; 707/803
(58) Field of Classification Search
None
See application file for complete search history.

(56) References Cited

U.S. PATENT DOCUMENTS

| | | | |
|---|---|---|---|
| 2003/0140081 A1 | 7/2003 | de Bonet et al. | |
| 2005/0034029 A1* | 2/2005 | Ramberg et al. | 714/43 |
| 2006/0091999 A1* | 5/2006 | Howarth | 340/10.3 |
| 2008/0197974 A1 | 8/2008 | Kim | |
| 2010/0005155 A1* | 1/2010 | Jain et al. | 709/219 |

FOREIGN PATENT DOCUMENTS

| | | |
|---|---|---|
| JP | 2005-341444 | 12/2005 |
| JP | 2009-48535 | 3/2009 |
| KR | 10-2008-0017007 | 2/2008 |

OTHER PUBLICATIONS

A Publication of SNMP command list by Dan DiNicoclo as May 16, 2007.*
Kim, Jong Hoon et al., "Design and Implementation of NMS with Object-oriented Technology," The Korean Institute of Information Scientists and Engineers, vol. 30(2):310-312 (2003).

* cited by examiner

*Primary Examiner* — Tai T Nguyen
*Assistant Examiner* — Ojiako Nwugo
(74) *Attorney, Agent, or Firm* — Nelson Mullins Riley & Scarborough LLP

(57) ABSTRACT

A method and apparatus for operating a server for an RFID reader by using both an SNMP command language and an RM/RP command language, and a method for operating an RFID reader are provided. The method for operating a server for an RFID reader includes: generating a mapping table including an object of an RFID reader, a management target, and an object identifier (OID) which are mapped to each other; checking and configuring the object of the RFID reader by using an simple network management protocol (SNMP) command language; and checking and configuring the object of the RFID reader by using a reader management/reader protocol (RM/RP) command language.

20 Claims, 7 Drawing Sheets

METHOD AND APPARATUS FOR OPERATING SERVER FOR RFID READER AND METHOD FOR OPERATING RFID READER

CROSS-REFERENCE TO RELATED APPLICATIONS

This application claims the priority of Korean Patent Application No. 10-2009-0127510 filed on Dec. 18, 2009 and No. 10-2010-0058044 filed on Jun. 18, 2010, in the Korean Intellectual Property Office, the disclosure of which is incorporated herein by reference.

BACKGROUND OF THE INVENTION

1. Field of the Invention

The present invention relates to a method and apparatus for operating a server for an RFID reader and a method for operating an RFID reader, and more particularly, to a method and apparatus for operating a server for an RFID reader by using both a simple network management protocol (SNMP) command language (or an instruction word) and a reader management/reader protocol (RM/RP) command language, and a method for operating an RFID reader.

2. Description of the Related Art

An RFID technique has been advanced with the use of various levels of software solutions, including a hardware technique of an RFID reader device that identifies and collects RFID tag data and a middleware technique that receives the TAG data collected by the RFID reader device, generates an event, and provides it to multiple user application solutions.

Software techniques used for managing the RFID reader device have been standardized on the basis of diverse de facto standards and international standards. However, each standardization technique has a limitation in its technique, making it difficult to effectively manage an RFID reader, thus requiring the use of a supplementary non-standard technique in conjunction to complement (offset?) the limitation.

Currently, an RFID reader management technique includes a reader management (RM) and a reader protocol (RP) proposed by the de facto standard EPCglobal and a simple network management protocol (SNMP)-based management technique proposed by ISO/IEC 24791-3, an international standard technique. The RM/RP and SNMP standard techniques provide substantially the same function, which are, thus, admitted as mutually alternative techniques allowing either the RM/RP or the SNMP to be chosen to be used in the RFID reader management technique.

However, the RM/RP has command languages, each having a form able to access a single variable of an RFID reader, so when a server intends to store all the types of configuration information regarding the RFID reader (e.g., the name of the RFID reader, the address of the RFID reader, a detailed description of the RFID reader, the number of antennas of the RFID reader, and the like), the server must access all of the variables (of a total of more than about 300 variables) one by one, increasing the number of messages and prolonging a configuration time.

In case of the SNMP-based management technique, a management information base (MIB) is configured on the basis of the SNMP. With this method, when information regarding record rows made up of a plurality of records is retrieved, there is no way to know about the number of record rows. Thus, a GetNext message is used to determine the number of record rows, which, however, disadvantageously increases the amount of messages. In addition, the SNMP-based management technique does not provide a function of generating or deleting records of a record row, which, thus, requires a method for complementing the function.

In short, the RM/RP causes an excessive amount of data traffic, and the SNMP lacks the ability of generating or deleting a record row. In addition, the use of the RM/RP and the use of the SNMP inevitably bring about the necessity of using a non-standard command language in order to complement their problems.

SUMMARY OF THE INVENTION

An aspect of the present invention provides a method for operating a server of an RFID (Radio Frequency Identification) reader capable of using both a simple network management protocol (SNMP) command language and a reader management/reader protocol (RM/RP) command language together.

Another object of the present invention provides a method for operating an RFID reader capable of using both an SNMP command language and an RF/RP command language together.

Another object of the present invention is to provide a service device for an RFID reader capable of using both an SNMP command language and an RF/RP command language together.

According to an aspect of the present invention, there is provided a method for operating a server for an RFID reader, including: generating a mapping table including an object of an RFID reader, a management target, and an object identifier (OID) which are mapped to each other; checking and configuring the object of the RFID reader by using an simple network management protocol (SNMP) command language; and checking and configuring the object of the RFID reader by using a reader management/reader protocol (RM/RP) command language.

In generating the mapping table, the mapping table may be generated on the basis of a management information base (MIB) defined in the RM.

The object of the RFID reader, a management target, may be one of a single object or an object made up of a record row.

In generating the mapping table, a getAll command language among RM/RP command languages may be used to recognize the number of records of the object made up of the record row.

In checking and configuring the object of the RFID reader by using the SNMP command language, the object of the RFID reader may be checked and configured by using the OID mapped to the object of the RFID reader.

In checking and configuring the object of the RFID reader by using the SNMP command language, a GetBulkRequest command language among SNMP command languages, may be used.

In checking and configuring the object of the RFID reader by using the RM/RP command language, the object of the RFID reader may be checked and configured without using the OID mapped to the object of the RFID reader.

The method may further include: generating the object of the RFID reader by using a create command language among the RM/RP command languages.

The method for operating a server of the RFID reader may use both the SNMP command language and the RM/RP command language together.

Alarm information may be received from the RFID reader by using at least one of the SNMP command language and the RM/RP command language.

A plurality of RFID readers, management targets, may be provided.

According to another aspect of the present invention, there is provided a method for operating an RFID reader, including: receiving at least one of a simple network management protocol (SNMP) command language and a reader management/reader protocol (RM/RP) command language from a server that manages an RFID reader; and when a command language received from the server is the SNMP command language, transmitting a response to the SNMP command language to the server, and when a command language received from the server is the RM/RP command language, transmitting a response to the RM/RP command language to the server.

The RFID reader may transfer alarm information to the server by using at least one of the SNMP command language and the RM/RP command language.

According to another aspect of the present invention, there is provided a server device for an RFID reader, including: a mapping table showing a mapping relationship between an object of an RFID reader, a management target, and an object identifier (OID); a controller configured to check and configure the object of the RFID reader by using at least one of a simple network management protocol (SNMP) command language and a reader management/reader protocol (RM/RP) command language; and a transceiver configured to transmit and receive the SNMP command language and the RM/RP command language.

The mapping table may be generated on the basis of a management information base (MIB) defined in the RM.

The controller may check and configure the object of the RFID reader by using the SNMP command language including the OID of the mapping table.

The controller may check and configure the object of the RFID reader by using the RM/RP command language which does not include the OID of the mapping table.

The server device may use both the SNMP command language and the RM/RP command language together.

Alarm information may be received from the RFID reader by using at least one of the SNMP command language and the RM/RP command language.

A plurality of RFID readers, management targets, may be provided.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
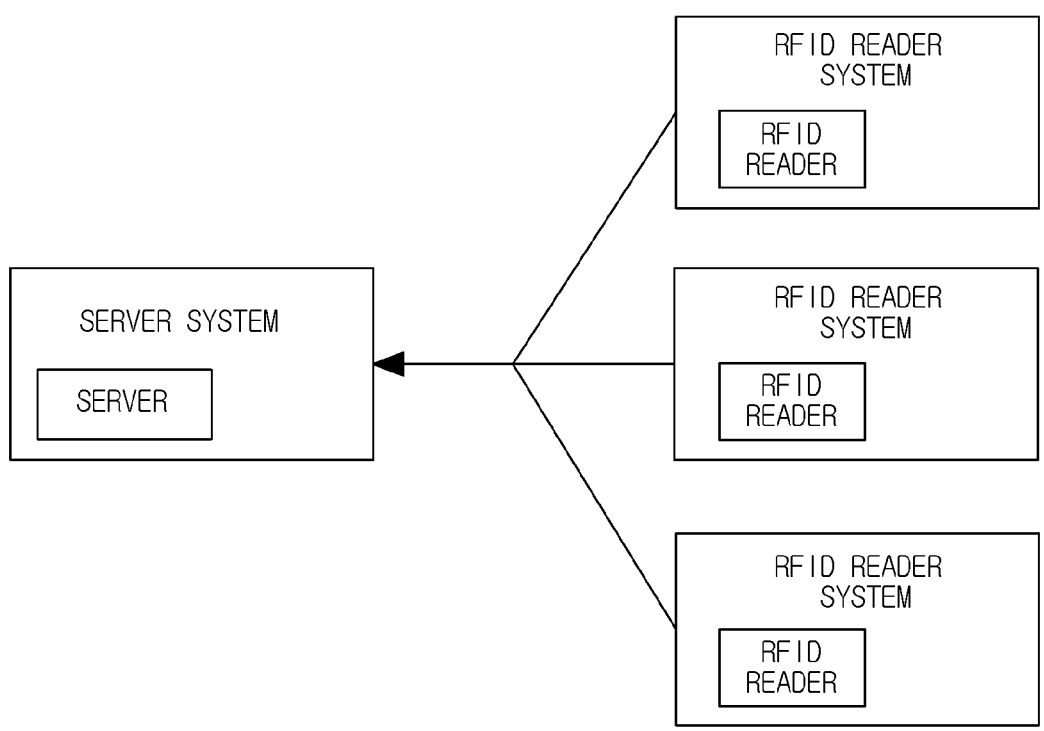
FIG. 1 is a schematic block diagram showing the structure of a management system.

The present invention may be modified variably and may have various embodiments, particular examples of which will be illustrated in drawings and described in detail.

However, it should be understood that the following exemplifying description of the invention is not intended to restrict the invention to specific forms of the present invention but rather the present invention is meant to cover all modifications, similarities and alternatives which are included in the spirit and scope of the present invention.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present invention will be described below in detail with reference to the accompanying drawings, where those components are rendered using the same reference number that are the same or are in correspondence, regardless of the figure number, and redundant explanations are omitted.

Figure 2:
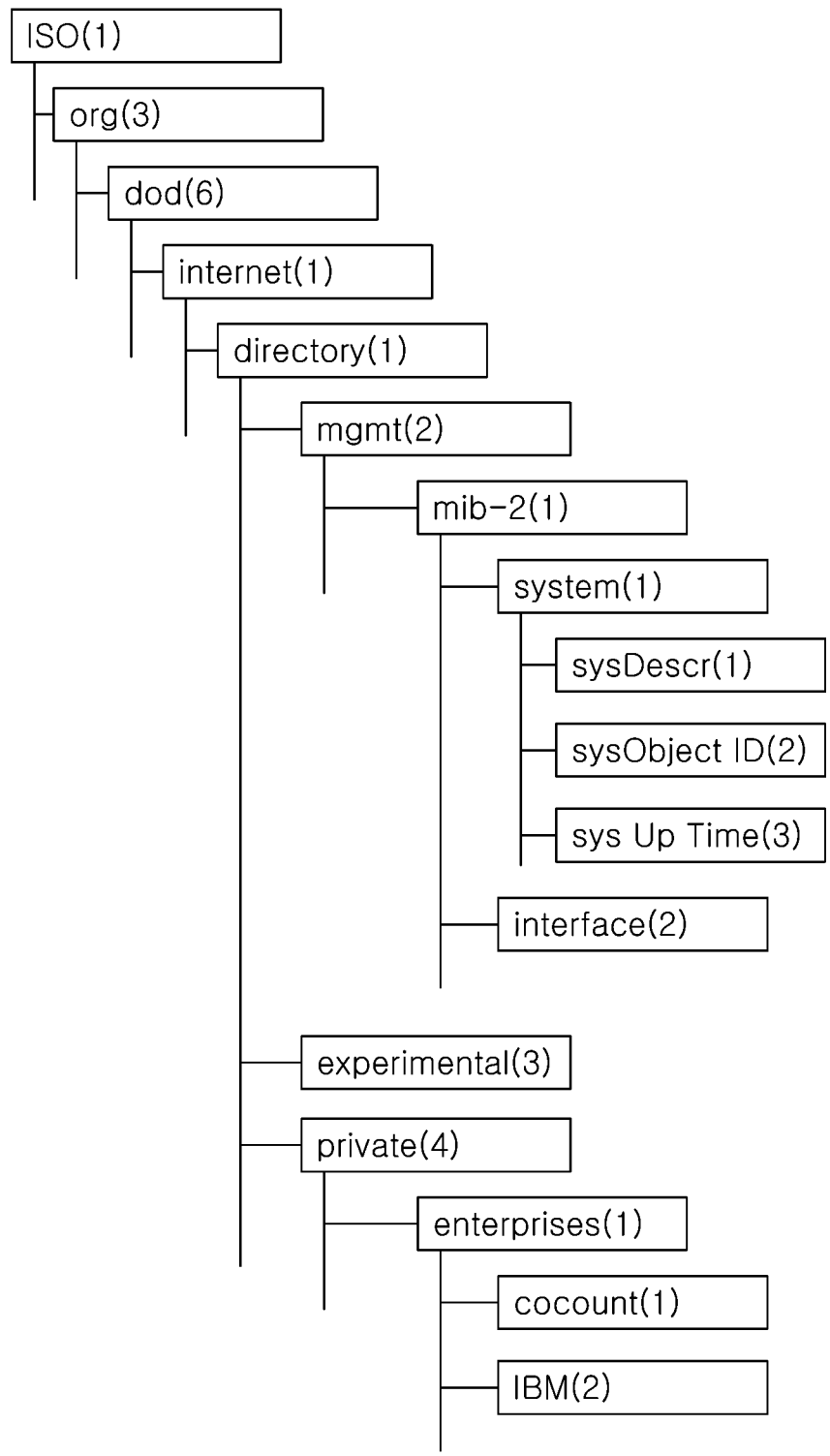
FIG. 2 is a view for explaining an object identifier (OID) structure according to a simple network management protocol (SNMP)

FIG. 1 is a schematic block diagram showing the structure of a management system. FIG. 2 is a view for explaining an object identifier (OID) structure according to a simple network management protocol (SNMP).

With reference to FIG. 1, software in use for managing an RFID reader includes a server executed in a server system such as a network management system (NMS) and an RFID reader executed in a reader system such as an RFID reader.

Namely, the RFID reader is executed in each reader system, receives a management command from a server, and transmits a corresponding response to the server.

In general, a single server manages a plurality of RFID readers, and as discussed above, a reader management/reader protocol (RM/RP) managing the RFID reader is provided as a de facto standard, and the SNMP is provided as an international standard.

With reference to FIG. 2, the structure of an OID of the SNMP, the international standard managing the RFID readers, can be known.

The uppermost value denotes an ISO, and values sequentially denoting org, dod, internet, and directory are assigned as international standards. Thus, an OID in use for equipment developed by a general company has form such as 1.3.6.1.1.4.1.x.x.x.x.

Figure 3:
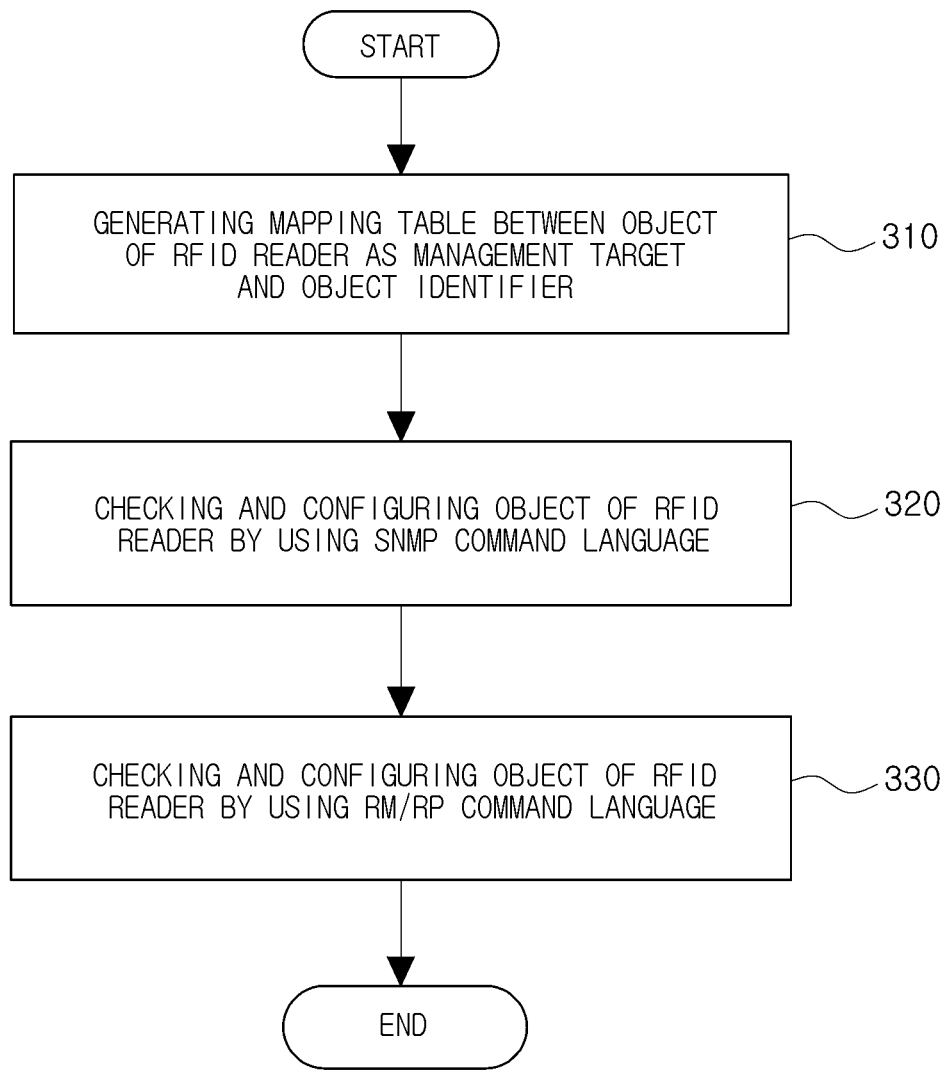
FIG. 3 is a flow chart illustrating the process of a method for operating a server for an RFID reader according to an exemplary embodiment of the present invention.
Figure 4:
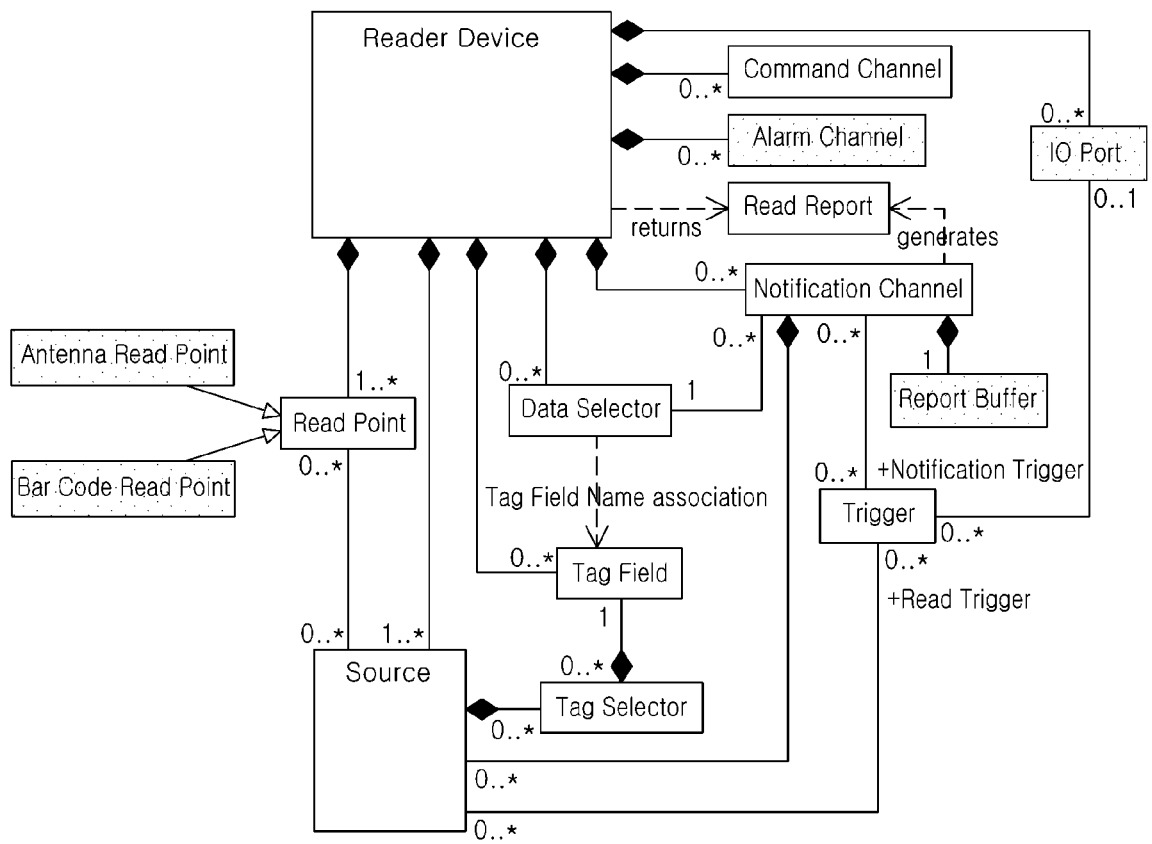
FIG. 4 is a view for explaining the structure of an object of the RFID reader according to an exemplary embodiment of the present invention.
Figure 5:
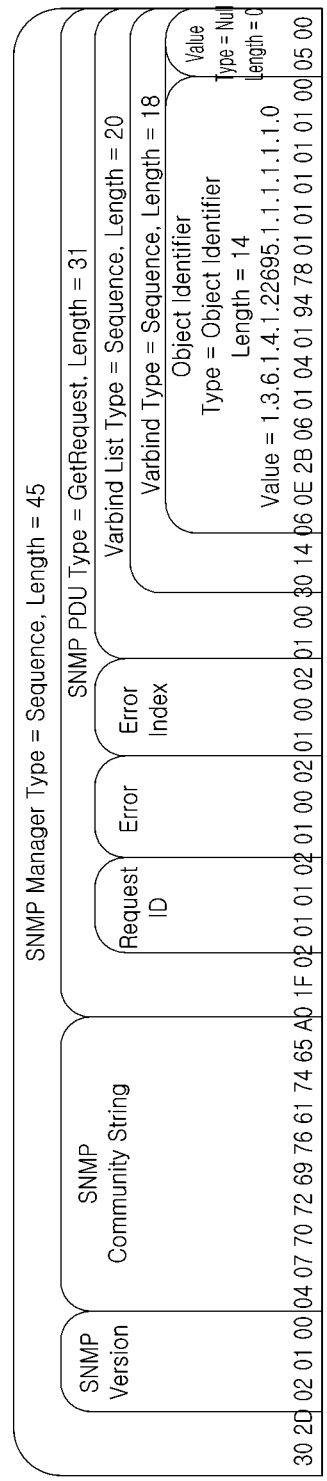
FIG. 5 is a view for explaining the structure of an SNMP message according to an exemplary embodiment of the present invention.

FIG. 3 is a flow chart illustrating the process of a method for operating a server for an RFID reader according to an exemplary embodiment of the present invention. FIG. 4 is a view for explaining the structure of an object of the RFID reader according to an exemplary embodiment of the present invention. FIG. 5 is a view for explaining the structure of an SNMP message according to an exemplary embodiment of the present invention.

With reference to FIG. 3, a method for operating a server for an RFID reader according to an exemplary embodiment of the present invention includes a step 310 of generating a mapping table including an object of an RFID reader, a management target, and an object identifier (OID) which are mapped to each other, a step 320 of checking and configuring the object of the RFID reader by using an SNMP command language, and a step 330 of checking and configuring the object of the RFID reader by using an RM/RP command language.

First, the mapping table shows a mapping relationship between the object to be managed by an RFID reader, a management target, and an OID corresponding to the object.

In step 310 of generating a mapping table, the mapping table may be generated on the basis of a management information base (MIB) defined in a reader management (RM).

With reference to FIGS. 3 and 4, the results of logically modeling an RFID reader by using the RM/RP can be known.

An object of the RFID reader may be a single object that can be expressed by a general variable, or may be objects of NotificationChannel, Trigger, IOPort, AntennaReadPoint, ReadPoint, and Source, which have elements of 0 or larger in association with the RFID reader, namely, which can be expressed as a record row, respectively.

Namely, the object of the RFID reader, the management target, in the method for operating the server for the RFID reader may be one of a single object or objects configured as a record row.

Meanwhile, in the RFID reader, the mapping table regarding the RFID reader may be represented by the name of the object and each OID. Command languages get and set may be used for elements of each logical object. Hereinafter, the procedure of reading elements of each object on the basis of an RFID reader object structure will be described.

First, an object of the RFID reader may be classified into an object, such as a ReaderDevice object, of a general variable, which does not require an index, and objects each having a record row which require indexes such as NotificationChannel, Trigger, IOPort, AntennaReadPoint, ReadPoint, and Source.

In step 310 of generating the mapping table, a getAll command language, one of the RM/RP command languages, may be used in order to recognize the number of records of the objects each configured to have a record row.

In transmitting a GetRequest message by mapping elements desired to be retrieved with respect to the object to OID, an OID of a simple object such as a ReaderDevice object is included in the message as it is and transmitted, and in case of objects, such as NotificationChannel, Trigger, IOPort, AntennaReadPoint, ReadPoint, and Source, configured to include a record row, a getAll message with respect to each object of the RM/RP is transmitted to recognize the number of records, and after the number of records is recognized, it is included in a GetBulkRequest message, an SNMP command language, is transmitted.

Namely, when the RM/RP command language is used for the object including a record row whose number of records is known, command languages by the number of records must be used, but when the number of records is known, the value of the plurality of records can be known at a time by using the GetBulkRequest message, an SNMP command language.

In addition, when the value of an OID is intended to be known, one or more OIDs may be transmitted in the GetRequest command language. Then, a response in the form of <OID, Value> may be received in GetResponse, and when one OID is transmitted, a next OID value may be received in the form of <OID, Value> in the GetResponse.

When a plurality of OID values are intended to be known, the number corresponding to a start OID and an area may be transferred in the GetBulkRequest command language. Then, a response in the form of <OID, Value> by the number starting from the corresponding OID may be received in GetResponse, and this obtains the same effect as a case in which the GetNext command language is repeatedly executed several times. Also, when the value of the OID is intended to be set, a SetRequest command language may be transmitted in the form of <OID, Value> so as to be configured.

With reference to FIG. 5, an SNMP message structure according to an exemplary embodiment of the present invention may be known. A maximum length of the message cannot exceed 1,500 bytes including an IP header (20 bytes to 60 bytes) and a UDP header (8 bytes), so the number of OIDs that can be transmitted at once by the GetRequest message may be about 87 OIDs.

Embodiment 1: Reading Elements of ReaderDevice Object, One of RFID Reader Objects Elements of a ReaderDevice object are mapped to OIDs as shown in Table 1 below and unmapped objects are included.

TABLE 1

| Name of element | OID |
|---|---|
| EPC | 1.3.6.1.1.4.1.22695.1.1.1.1.1.3.0 |
| Manufacturer | Element of RF-OID undefined |
| Model | Element of RF-OID undefined |
| Handle | Element of RF-OID undefined |
| Name | Element of RF-OID undefined |
| Role | 1.3.6.1.1.4.1.22695.1.1.1.1.1.2.0 |
| TimeTicks | Element of RF-OID undefined |
| TimeUTC | 1.3.6.1.1.4.1.22695.1.1.1.1.1.5.0 |
| ManufacturerDescription | Element of RF-OID undefined |
| CurrentSource | 1.3.6.1.1.4.1.22695.1.1.1.1.1.6.0 |
| Reboot | 1.3.6.1.1.4.1.22695.1.1.1.1.1.7.0 |
| Description | 1.3.6.1.1.4.1.22695.1.1.1.1.1.1.0 |
| LocationDescription | Element of RM-OID undefined |

TABLE 1-continued

| Name of element | OID |
| --- | --- |
| Contact | Element of RM-OID undefined |
| SerialNumber | 1.3.6.1.1.4.1.22695.1.1.1.1.1.1.0 |
| OperStatus | 1.3.6.1.1.4.1.22695.1.1.1.1.1.1.0 |
| OperStatusAlarmControl. Name | Element of RM-OID undefined |
| OperStatusAlarmControl. Enabled | 1.3.6.1.1.4.1.22695.1.1.1.1.3.0 |
| OperStatusAlarmControl. Level | 1.3.6.1.1.4.1.22695.1.1.1.1.3.6.0 |
| OperStatusAlarmControl. SuppressInterval | 1.3.6.1.1.4.1.22695.1.1.1.1.3.7.0 |
| OperStatusAlarmControl. TriggerFromState | 1.3.6.1.1.4.1.22695.1.1.1.1.3.4.0 |
| OperStatusAlarmControl.TriggerToState | 1.3.6.1.1.4.1.22695.1.1.1.1.3.5.0 |
| FreeMemory | 1.3.6.1.1.4.1.22695.1.1.1.1.4.1.0 |
| FreeMemoryAlarmControl. Name | Element of RM-OID undefined |
| FreeMemoryAlarmControl. Enabled | 1.3.6.1.1.4.1.22695.1.1.1.1.4.2.0 |
| FreeMemoryAlarmControl. Level | 1.3.6.1.1.4.1.22695.1.1.1.1.4.3.0 |
| FreeMemoryAlarmControl. SuppressInterval | 1.3.6.1.1.4.1.22695.1.1.1.1.4.7.0 |
| FreeMemoryAlarmControl. AlarmThreshold | 1.3.6.1.1.4.1.22695.1.1.1.1.4.4.0 |
| FreeMemoryAlarmControl. RearmThreshold | 1.3.6.1.1.4.1.22695.1.1.1.1.4.5.0 |
| FreeMemoryAlarmControl. Direction | Element of RM-OID undefined |
| FreeMemoryAlarmControl. Status | 1.3.6.1.1.4.1.22695.1.1.1.1.4.6.0 |
| resetStatistics | 1.3.6.1.1.4.1.22695.1.1.1.1.8.0 |
| CurrentDataSelector | Element of RF-OID undefined |
| AllSources | Method of obtaining record row used. Procedure described in second embodiment. |
| AllDataSelectors | Method of obtaining record row used. |
| AllNotificationChannels | Method of obtaining record row used. |
| AllTriggers | Method of obtaining record row used. |
| AllTagSelectors | Method of obtaining record row used. |
| AllTagFields | Method of obtaining record row used. |
| AllReadPoints | Method of obtaining record row used. |

The ReaderDevice object has a total of 40 elements, and OID is defined for 21 elements of them, so it can be acquired by using a single GetRequest message. The other elements must be acquired by using a message provided in the RP and the RM. As a result, the number of transmission and reception messages required to obtain all of the elements of the ReaderDevice object is 12.

Embodiment 2: Reading Elements of Source Object

One or more Source objects may exist as sub-objects of the ReaderDevice object, so the number of the Source objects must be known first. In order to recognize the number of Source objects, a ReaderDevice.getAllSources command language of the RP is used. The number of record rows is recognized by a return value, and index information of each record is acquired by using the GetBulkRequest message.

For example, when the number of the record rows of the Source object is determined to be 10, an OID of 1.3.6.1.1.4.1.22695.1.1.1.5.1.1 of epcgSourceEntry is put in the GetBulkRequest, and the number of OIDs desired to be acquired is filled to be 10 and transmitted to acquire the index of each record.

With the indexes acquired, an idx column of the OID in the following procedure is filled to generate a GetRequest message. Accordingly, a mapping table shown below can be generated.

TABLE 2

| Name of element | OID |
| --- | --- |
| OperSTatusAlarmControl. Name | Element of RM-OID undefined |
| OperSTatusAlarmControl. Enabled | 1.3.6.1.1.4.1.22695.1.1.1.5.1.1.18.idx.0 |
| OperSTatusAlarmControl. Level | 1.3.6.1.1.4.1.22695.1.1.1.5.1.1.21.idx.0 |
| OperSTatusAlarmControl. SuppressInterval | 1.3.6.1.1.4.1.22695.1.1.1.5.1.1.24.idx.0 |
| OperSTatusAlarmControl. TriggerFromState | 1.3.6.1.1.4.1.22695.1.1.1.5.1.1.19.idx.0 |
| OperSTatusAlarmControl. TriggerToState | 1.3.6.1.1.4.1.22695.1.1.1.5.1.1.20.idx.0 |
| UnknownToGlimpsedCount | 1.3.6.1.1.4.1.22695.1.1.1.5.1.1.10.idx.0 |
| GlimpsedToUnknownCount | 1.3.6.1.1.4.1.22695.1.1.1.5.1.1.11.idx.0 |
| GlimpsedToObservedCount | 1.3.6.1.1.4.1.22695.1.1.1.5.1.1.12.idx.0 |
| ObservedToLostCount | 1.3.6.1.1.4.1.22695.1.1.1.5.1.1.18.idx.0 |
| AllReadTriggers | Method of obtaining record row used. |
| LostToGlimpsedcount | 1.3.6.1.1.4.1.22695.1.1.1.5.1.1.14.idx.0 |
| LostToUnknownCount | 1.3.6.1.1.4.1.22695.1.1.1.5.1.1.15.idx.0 |
| OperStatus | 1.3.6.1.1.4.1.22695.1.1.1.5.1.1.17.idx.0 |
| AdminStatus | 1.3.6.1.1.4.1.22695.1.1.1.5.1.1.16.idx.0 |
| AllReadPoints | Method of obtaining record row used. |
| isFixed | Element of RF-OID undefined |
| Name | 1.3.6.1.1.4.1.22695.1.1.1.5.1.1.2.idx.0 |
| Session | Element of RF-OID undefined |
| ReadTimeout | 1.3.6.1.1.4.1.22695.1.1.1.5.1.1.5.idx.0 |
| MaxReadDutyCycle | 1.3.6.1.1.4.1.22695.1.1.1.5.1.1.4.idx.0 |
| ReadCyclesPerTrigger | 1.3.6.1.1.4.1.22695.1.1.1.5.1.1.3.idx.0 |
| LostTimeout | 1.3.6.1.1.4.1.22695.1.1.1.5.1.1.9.idx.0 |
| ObservedTimeout | 1.3.6.1.1.4.1.22695.1.1.1.5.1.1.8.idx.0 |
| MaxNumberSupported | Element of RF-OID undefined |
| ObservedThreshold | 1.3.6.1.1.4.1.22695.1.1.1.5.1.1.7.idx.0 |
| GlimpsedTimeout | 1.3.6.1.1.4.1.22695.1.1.1.5.1.1.6.idx.0 |
| AllTagSelectors | Method of obtaining record row used. |

An SNMP message can be generated with reference to the mapping table as shown above.

For example, the OID-defined elements are encoded by the GetRequest message. The elements of the Source object total 28, and 21 elements of them are OID-defined elements. The number of messages is determined according to the number of records as follows.

When the number of OID-defined elements of the Source object is 21 and the number of records is 10, because a maximum number of OIDs that can be included in a single SNMP message is 87, three GetRequest messages are generated. Here, when the RP and RM messages are added thereto, the number of messages required to obtain the Source object is 7.

Next, in step 320 of checking and configuring the object of the RFID reader by using the SNMP command language, the object of the RFID reader may be checked and configured by using an OID mapped to the object of the RFID reader.

In addition, in step 320 of checking and configuring the object of the RFID reader by using the SNMP command language, the GetBulkRequest command language, one of the SNMP command languages, may be used.

Next, in step 330 of checking and configuring the object of the RFID reader by using the RM/RP command language, the object of the RFID reader may be checked and configured without using the OID mapped to the object of the RFID reader.

In addition, the method for operating the server for the RFID reader according to an exemplary embodiment of the present invention may further include generating the object of the RFID reader by using a create command language, one of the RM/RP command languages.

Embodiment 3: Reading Element of Object on the Basis of OID Structure

The procedure of reading elements of objects on the basis of an OID structure of the RFID reader will now be described.

First, the GetRequest message is generated to acquire a simple variable. EPGglobal SMI MIB variables include a simple variable and a plurality of record rows. The simple variable is included in objects such as epcgReaderDeviceInformation, epcgReaderDeviceOperation, epcgReaderDeviceMemory, and the like, and the other variables are included in record rows such as epcgGlobalCountersTable, epcgReaderServerTable, epcgReadPointTable, epcgAntReadPointTable, epcgIoPortTable, epcgSourceTable, epcgRdPntSrcTable, epcgNotifChanSrcTable, epcgNotificationChannelTable, epcgTriggerTable, epcgNotifTrigTable, epcgReadTrigTable, and the like.

As for the simple variable, each OID may be included in the GetRequest message and transmitted, and 11 simple variables are included in epcgReaderDeviceInformation, 3 simple variables are included in epcgReaderDeviceOperation, and 8 simple variables are included in epcgReaderDeviceMemory. Thus, a total of 27 OIDs can be included in a single GetRequest message and transmitted.

Thereafter, the RP and RM command languages are used to recognize the number of records of each record row. The number of record rows of each Table is obtained by using the RM/RP command language, and the indexes of the records of each record row of each Table are obtained as follows.

An OID of entry of each Table is put in the GetBulkRequest to fill the number of a record row, which is then transmitted. When the indexes are acquired, an OID list including indexes of each Table attached thereto is created to generate a GetRequest message. The value of the MIB is filled with the value of the configuration information acquired according to the foregoing procedure.

Embodiment 4: Counter Monitoring Method of RFID Reader

A counter monitoring method of the RFID reader will now be described.

In order to periodically obtain a value of a counter variable provided by the RFID reader, first, a time period desired by the user is determined and counter information of the RFID reader is monitored according to the period. The RFID reader provides counter variables for Source, AntennaReadPoint, Trigger objects, and the following procedure is performed in order to get the counter variables.

TABLE 3

| Name of elements | OID |
| --- | --- |
| UnknownToGlimpsedCount | 1.3.6.1.1.4.1.22695.1.1.1.5.1.1.10.idx.0 |
| GlimpsedToUnknownCount | 1.3.6.1.1.4.1.22695.1.1.1.5.1.1.11.idx.0 |
| GlimpsedToObservedCount | 1.3.6.1.1.4.1.22695.1.1.1.5.1.1.12.idx.0 |
| ObservedToLostCount | 1.3.6.1.1.4.1.22695.1.1.1.5.1.1.13.idx.0 |
| LostToGlimpsedCount | 1.3.6.1.1.4.1.22695.1.1.1.5.1.1.14.idx.0 |
| LostToUnknownCount | 1.3.6.1.1.4.1.22695.1.1.1.5.1.1.15.idx.0 |

An OID mapping table for the counter variables among the elements of the Source object is created. Because the number of record rows of the Source object and the index values of the respective records are known, a GetRequest message including the OID list including indexes for Source desired to be monitored is generated. The user transmits GetRequest according to a pre-set period to collect corresponding variable values. The same process is performed on the AntennaReadPoint object and the Trigger object.

Embodiment 5: Setting Variables to Control RFID Reader

A method for setting variables for controlling the RFID reader will now be described. When only a value with respect to a single variable is intended to be simply updated, the RM/RP command language may be used or the SetRequest message may be used. When values with respect to two or more variables are intended to be updated, a <OID, Value> list having two or more OIDs and the values desired to be changed included in a Value field is created to generate a SetRequest.

The SetRequest message is transmitted to update variables, and the values of the changed variables are acknowledged and information of a server is updated. The values of the changed variables may be acknowledged by using error information (updating failure, an erroneous OID) of a response message or by retransmitting the GetRequest.

Embodiment 6: Configuring Object of Logical Mode of RFID Reader by Server When the Object Is Updated A method of configuring an object of a logical mode of the RFID reader by the server when the object is updated will now be described. The ReaderDevice object includes a command language for generating and deleting respective logical objects. Thus, a logical object may be generated or deleted by using the command language. In this case, with respect to the changed information resulting from the generation or deletion, the consistency between the configuration information of the RFID reader and data must be maintained, so the server reconfigures information regarding the corresponding object.

First, the server generates a new Source object by using Source.create, an RP command language, The server includes an OID of epcgSourceEntry and the total number of the Source objects+1 in GetBulkRequest and checks an index newly assigned to the Source object.

The server gets the elements of the newly generated Source object by using the GetRequest to update the information of the server.

An RP command language Source.create, ReaderDevice.removeSources of the Source object may generate and delete the Source object. An RP command language NotificationChannel.create, ReaderDevice.removeNotificationChannels may generate and delete a NotificationChannel object. An RP command language Trigger.create, ReaderDevice.removeTriggers may generate and delete the Trigger object.

Meanwhile, in the method for operating the server for the RFID reader according to an exemplary embodiment of the present invention, the SNMP command language and the RM/RP command language may be used together. Also, at least one of the SNMP command language and the RM/RP command language may be used to receive alarm information from the RFID reader. A plurality of RFID readers may be provided as management targets.

Embodiment 7: Acquiring Alarm Information Generated by RFID Reader

A method for acquiring alarm information generated by the RFID reader will now be described.

In one method, the server acquires alarm information transmitted by the RFID server through an alarm channel. The method of configuring the alarm channel is proposed in the RM.

In another method, the server applies an SNMP trap to the RFID reader and acquires received alarm information. In the case of using the SNMP trap, there is no need to configure an alarm channel.

In both methods, information regarding each alarm object is entirely transferred, so a procedure for acquiring additional information is not required.

Figure 6:
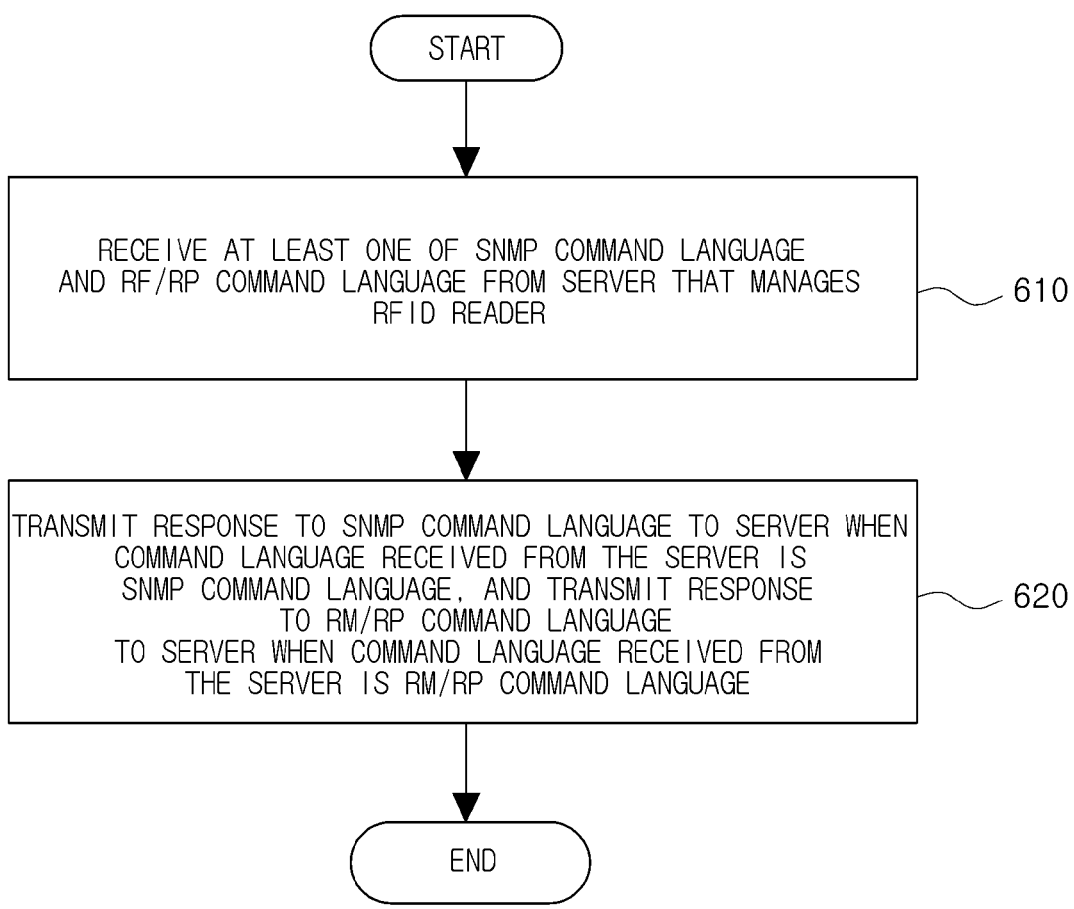
FIG. 6 is a flow chart illustrating the process of a method for operating an RFID reader according to an exemplary embodiment of the present invention.

FIG. 6 is a flow chart illustrating the process of a method for operating an RFID reader according to an exemplary embodiment of the present invention.

With reference to FIG. 6, a method for operating an RFID reader according to an exemplary embodiment of the present invention may include: a step 610 of receiving at least one of a simple network management protocol (SNMP) command language and a reader management/reader protocol (RM/RP) command language from a server that manages an RFID reader, and a step 620 of, when a command language received from the server is the SNMP command language, transmitting a response to the SNMP command language to the server, and when a command language received from the server is the RM/RP command language, transmitting a response to the RM/RP command language to the server.

Here, the RFID reader may transfer alarm information to the server by using at least one of the SNMP command language and the RM/RP command language.

Figure 7:
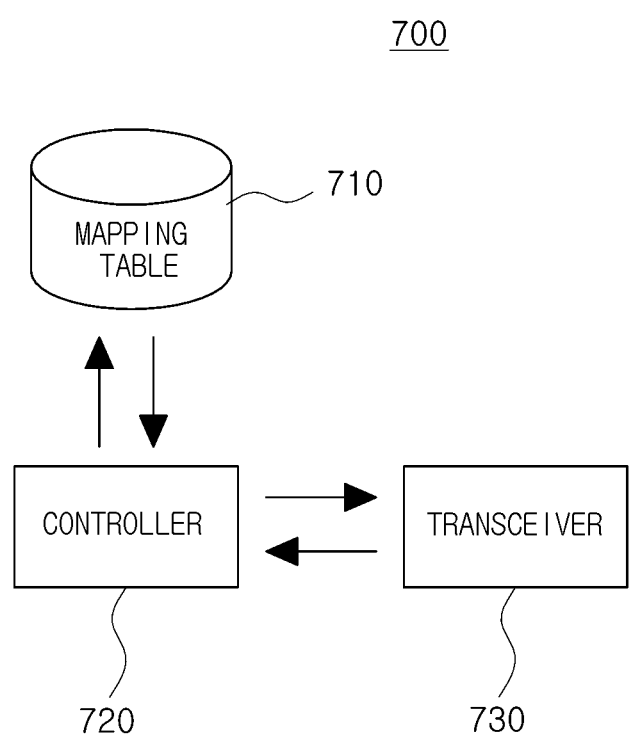
FIG. 7 is a schematic block diagram of a server device for an RFID reader according to an exemplary embodiment of the present invention.

FIG. 7 is a schematic block diagram of a server device for an RFID reader according to an exemplary embodiment of the present invention.

With reference to FIG. 7, a server device for an RFID reader may include a mapping table 710 showing a mapping relationship between an object of an RFID reader, a management target, and an object identifier (OID), a controller 720 configured to check and configure the object of the RFID reader by using at least one of a simple network management protocol (SNMP) command language and a reader management/reader protocol (RM/RP) command language, and a transceiver 730 configured to transmit and receive the SNMP command language and the RM/RP command language.

First, the mapping table shows the mapping relationship between an object of an RFID reader, a management target, and an OID, and the OID may be generated on the basis of a management information base (MIB) defined in the RM.

The controller 720 may check and configure the object of the RFID reader by using at least one of the SNMP command language and the RM/RP command language.

Also, the controller 720 may check and configure the object of the RFID reader by using the SNMP command language including the OID of the mapping table. The controller 702 may check and configure the object of the RFID reader by using by using the RM/RP command language that does not include the OID of the mapping table.

The transceiver 730 is an element for transmitting and receiving the SNMP command language and the RM/RP command language.

The server device 700 for the RFID reader may use both the SNMP command language and the RM/RP command language together.

The service device 700 for the RFID reader may receive alarm information from the RFID reader by using at least one of the SNMP command language and the RM/RP command language.

A plurality of RFID readers may be provided as the management targets of the server device 700 for the RFID reader.

As set forth above, in a method and apparatus for operating a server for an RFID reader by using both a simple network management protocol (SNMP) command language and a reader management/reader protocol (RM/RP) command language, and a method for operating an RFID reader according to exemplary embodiments of the invention, a method for accessing a plurality of variable values, not offered by the RM/RP, can be provided, and a method for searching for an index of a record row by using a single message and adding and deleting a record row, not offered by the SNMP, can be provided. In addition, the number of messages between a device and a server, which are requisite for managing the device, can be significantly reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for operating a server for an RFID reader, the method comprising:
    generating a mapping table including an object of an RFID reader, a management target, and an object identifier (OID) based on a reader management/reader protocol (RM/RP) response to a RM/RP command and a simple network management protocol (SNMP) response to a SNMP command;
    checking and configuring the object of the RFID reader by using an SNMP command language; and
    checking and configuring the object of the RFID reader by using a RM/RP command language.

2. The method of claim 1, wherein, in generating the mapping table, the mapping table is generated on the basis of a management information base (MIB) defined in a reader management.

3. The method of claim 1, wherein the object of the RFID reader, a management target, is one of a single object or an object made up of a record row.

4. The method of claim 3, further comprising transmitting the SNMP command based at least in part on the RM/RP response, wherein, the RM/RP command is a getAll command used to determine a number of records of the object made up of the record row.

5. The method of claim 1, wherein, in checking and configuring the object of the RFID reader by using the SNMP command language, the object of the RFID reader is checked and configured by using the OID mapped to the object of the RFID reader.

6. The method of claim 1, wherein, in checking and configuring the object of the RFID reader by using the SNMP command language, a GetBulkRequest command is used.

7. The method of claim 1, wherein, in checking and configuring the object of the RFID reader by using the RM/RP command language, the object of the RFID reader is checked and configured without using the OID mapped to the object of the RFID reader.

8. The method of claim 1, further comprising:
    generating the object of the RFID reader by using a create command among the RM/RP command languages.

9. The method of claim 1, wherein both the SNMP command language and the RM/RP command language are used together.

10. The method of claim 1, wherein alarm information is received from the RFID reader by using at least one of the SNMP command language and the RM/RP command language.

11. The method of claim 1, wherein a plurality of RFID readers, management targets, are provided.

12. A method for operating an RFID reader, the method comprising:
    the RFID reader receiving a reader management/reader protocol (RM/RP) command and a subsequent simple network management protocol (SNMP) command from a server that manages the RFID reader;
    transmitting a SNMP response to the SNMP command to the server; and
    transmitting a RM/RP response to the RM/RP command to the server.

13. The method of claim 12, wherein the RFID reader transfers alarm information to the server by using at least one of a SNMP command language and a RM/RP command language.

14. A server device for an RFID reader, the server device comprising:
- a mapping table showing a mapping relationship between an object of an RFID reader, a management target, and an object identifier (OID);
- a controller configured to check and configure the object of the RFID reader by using both a simple network management protocol (SNMP) command language and a reader management/reader protocol (RM/RP) command language; and
- a transceiver configured to transmit and receive the SNMP command language and the RM/RP command language,
- wherein the server generates the mapping table based at least on a RM/RP response to an RM/RP command transmitted to the RFID reader by the transceiver, and a SNMP response to an SNMP command transmitted to the RFID reader by the transceiver.

15. The server device of claim 14, wherein the transceiver transmits the SNMP command to the RFID reader based at least on the RM/RP response, and the server generates the mapping table based at least in part on a management information base (MIB) defined in a reader management.

16. The server device of claim 14, wherein the controller checks and configures the object of the RFID reader by using the SNMP command language including the OID of the mapping table.

17. The server device of claim 14, wherein the controller checks and configures the object of the RFID reader by using the RM/RP command language which does not include the OID of the mapping table.

18. The server device of claim 14, wherein the server device uses both the SNMP command language and the RM/RP command language together.

19. The server device of claim 14, wherein alarm information is received from the RFID reader by using at least one of the SNMP command language and the RM/RP command language.

20. The server device of claim 14, wherein a plurality of RFID readers, management targets, are provided.

* * * * *